(12) United States Patent
Li et al.

(10) Patent No.: US 7,421,143 B2
(45) Date of Patent: Sep. 2, 2008

(54) SYSTEMS AND METHODS FOR OPTIMAL DYNAMIC RANGE ADJUSTMENT OF SCANNED IMAGES

(75) Inventors: Xing Li, Webster, NY (US); Stuart A. Schweid, Pittsford, NY (US); Jeng-nan Shiau, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 760 days.

(21) Appl. No.: 10/709,832

(22) Filed: Jun. 1, 2004

(65) Prior Publication Data

US 2005/0265625 A1 Dec. 1, 2005

(51) Int. Cl.
*G06K 9/40* (2006.01)
(52) U.S. Cl. .................. 382/274; 382/124; 395/109
(58) Field of Classification Search .......... 382/274, 382/173; 358/446
See application file for complete search history.

(56) References Cited

U.S. PATENT DOCUMENTS

| 5,371,615 A * | 12/1994 | Eschbach ............. 358/515 |
|---|---|---|
| 5,537,484 A * | 7/1996 | Kobayashi ............ 382/124 |
| 5,850,474 A | 12/1998 | Fan et al. |
| 5,956,468 A * | 9/1999 | Ancin ................ 358/1.9 |
| 6,360,009 B2 | 3/2002 | Li et al. |
| 6,618,171 B1* | 9/2003 | Tse et al. ............. 358/446 |
| 6,674,899 B2 | 1/2004 | Nagarajan et al. |
| 7,058,222 B2* | 6/2006 | Li et al. ............. 382/170 |
| 2002/0135683 A1* | 9/2002 | Tamama et al. ........ 348/222 |
| 2003/0222998 A1* | 12/2003 | Yamauchi et al. ...... 348/262 |

* cited by examiner

*Primary Examiner*—Samir A. Ahmed
*Assistant Examiner*—Aklilu K Woldemariam
(74) *Attorney, Agent, or Firm*—Oliff & Berridge, PLC

(57) ABSTRACT

A method for dynamic range adjustment of image data of a captured image by determining a white point of an image. The method also involves determining a black point of the image, classifying pixels of the image, and determining an offset value for a pixel of the image based on the determined black point of the image and the determined classification of the pixel. Dynamic range adjustment of the image data is performed using the determined offset value for the pixels of the image and the determined white point of the image.

14 Claims, 4 Drawing Sheets

SYSTEMS AND METHODS FOR OPTIMAL DYNAMIC RANGE ADJUSTMENT OF SCANNED IMAGES

BACKGROUND OF THE INVENTION

1. Field of the Invention

The invention relates to systems and methods for optimizing dynamic range adjustment for different portions of an image using video and image segmentation information.

2. Description of the Related Art

In conventional scanners and digital copiers, the black point of an image is adjusted statically using a fixed offset value. With this method, it is possible that for some images the text may not be dark enough but for some other images the shadow details may get lost.

U.S. Pat. No. 6,618,171 discloses dynamic range adjustment of the black point of an image in order to improve the quality of the reproduced image. According to the method disclosed therein, the background level of the document is used to determine the white point of the image while the black point of the image is originally set to a default offset value. Based on the determined white point of the image, an adjustment factor is used to adjust the default offset value.

SUMMARY OF THE INVENTION

Non-optimal dynamic range adjustment may occur, for example, if relevant information is not available, data is improperly detected, detected data is improperly used and/or processing does not take into consideration the type of image data of a pixel.

Various exemplary embodiments of the invention provide a dynamic range adjustment method for dynamically adjusting image data of a captured image by determining a white point of an image. The method also involves determining a black point of the image, classifying pixels of the image, and determining an offset value for a pixel of the image based on the determined black point of the image and the determined classification of the pixel. Dynamic range adjustment of the image data is performed using the determined offset value for the pixels of the image and the determined white point of the image.

Various exemplary embodiments of the invention provide a dynamic range adjustment apparatus for dynamic range adjustment of image data. The apparatus includes a white point detection module for determining a white point of an image, a black point detection module for determining a black point of the image, a pixel classification module for classifying pixels of the image, and an offset value determination module. The offset value determination module determines an offset value for a pixel of the image based on the classification of the pixel and the determined black point of the image. The image data is processed using the determined white point, the determined pixel classifications and each determined offset value for the pixels of the image.

BRIEF DESCRIPTION OF THE DRAWINGS

Various exemplary embodiments of systems and methods of the invention will be described in detail, with reference to the following figures.

DETAILED DESCRIPTION OF EXEMPLARY EMBODIMENTS

Various exemplary embodiments of the invention provide systems and methods for dynamic range adjustment of image data using the detected white point and black point of an image. In various exemplary embodiments of the invention, the detected white point and black point of an image are used in conjunction with the pixel tags to dynamically adjust the range of the image.

As discussed above, conventional scanners and copiers, for example, statically adjust the black point of an image using a fixed offset value. While use of a fixed offset value may be suitable for some images, for other images, the resulting black point value may be too high or too low. The text, for example, may not be dark enough if a fixed offset value is used. While, for other images, shadow details may be lost if a fixed offset value is used. Thus, as discussed above, U.S. Pat. No. 6,618,171, discloses dynamic adjustment of the black point of an image based on the detected background level of the document.

Figure 1:
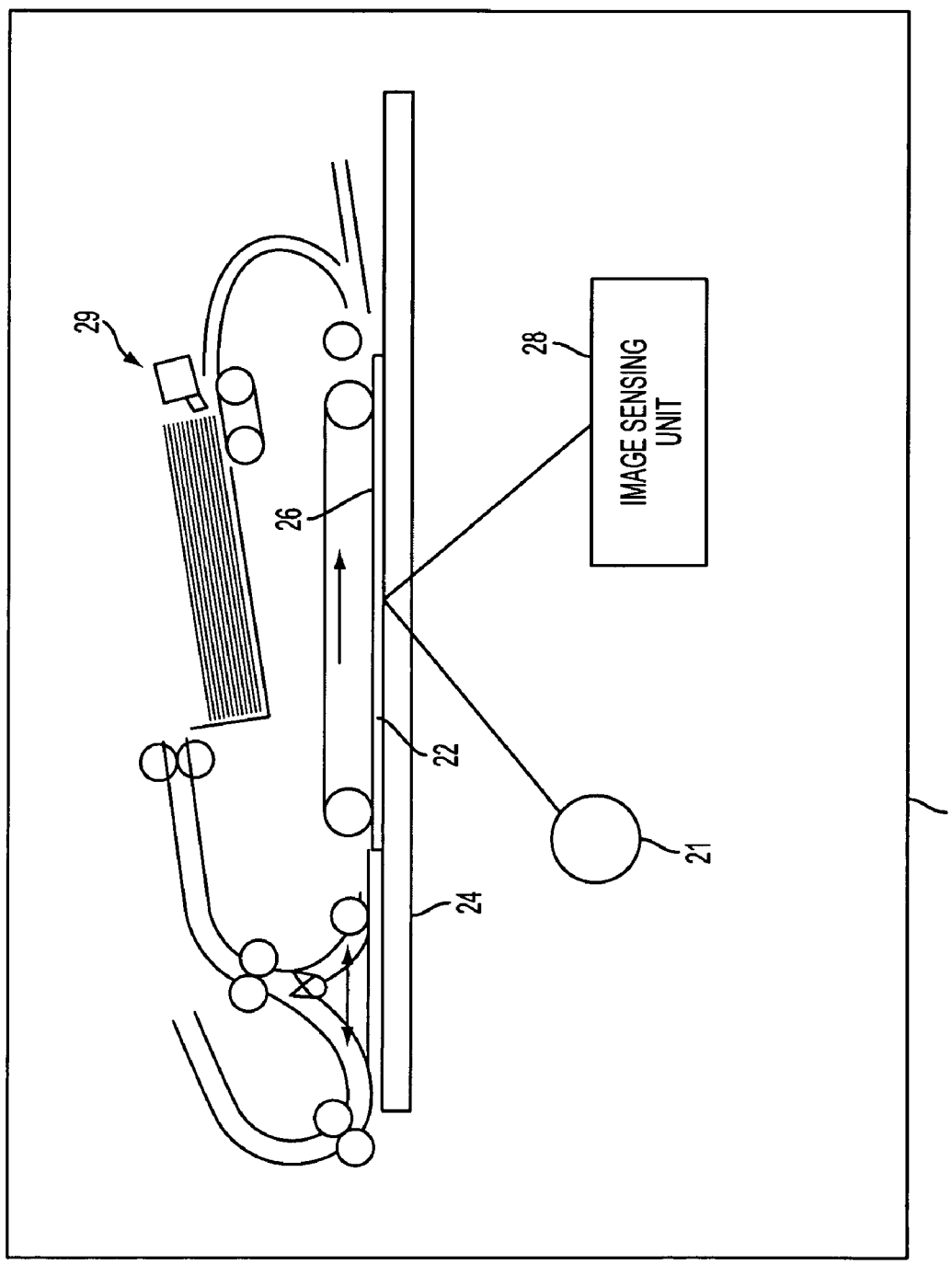
FIG. 1 is a diagram illustrating components of an exemplary digital scanner.

FIG. 1 illustrates components of an exemplary scanning unit 20 of a digital scanner. In the scanning unit 20, a light source 21 is used to illuminate a document 22 to be scanned. In a platen-type scanning situation, the document 22 usually rests upon a glass platen 24, which supports the document 22 for scanning purposes. The document 22 may be placed on the glass platen 24 by an operator. Alternatively, the scanning unit may include a feeder or document handler 29, which places the document on the glass 24.

On top of the glass platen 24 and the document 22, a backdrop portion (platen cover) 26 is placed to prevent stray light from leaving the scanning area to provide a background from which an input document can be distinguished. The backdrop portion 26 may be part of document handler 29. The backdrop portion 26 is the surface or surfaces that can be scanned by an image-sensing unit 28 when a document is or is not present in the scanning station. The light reflected from the document passes through a lens subsystem (not shown) so that the reflected light impinges upon the image sensing unit 28, such as a charge coupled device (CCD) array or a full width array.

A full width array typically comprises one or more linear arrays of photo-sites, wherein each linear array may be sensitive to one or more colors. In a color image capture device, the linear arrays of photo-sites are used to produce electrical signals which are converted to color image data representing the scanned document. However, in a black-and-white scanner, preferably, only one linear array of photo-sites is used to produce the electrical signals that are converted to black and white image data representing the image of the scanned document.

Figure 2:
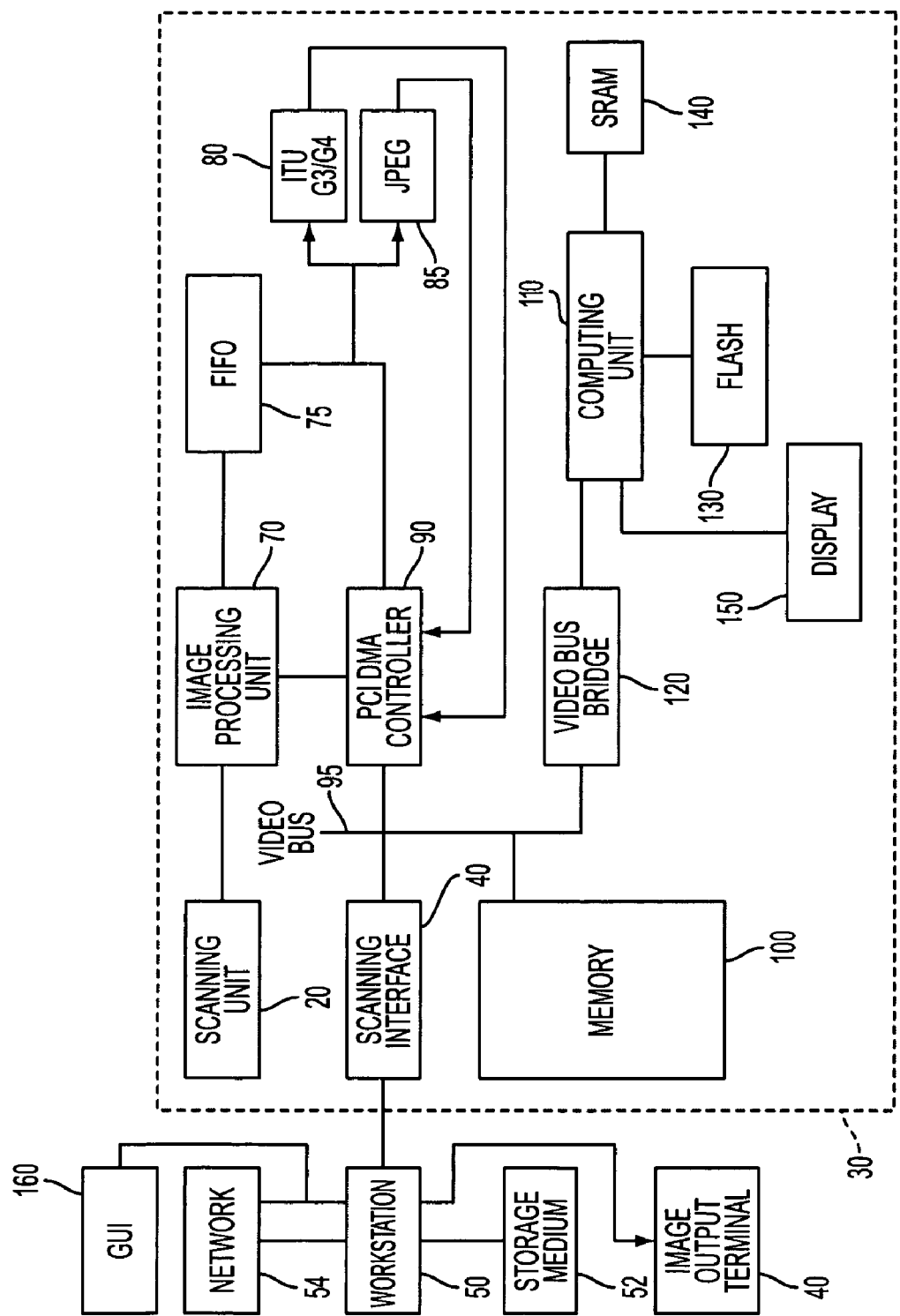
FIG. 2 is a block diagram illustrating the electronic architecture of an exemplary digital scanner coupled to a workstation, a network, a storage medium and an image output terminal in accordance with the exemplary embodiments of the invention.

FIG. 2 is a block diagram illustrating the electronic architecture of an exemplary digital scanner 30 including the scanning unit 20. The digital scanner 30 is coupled to a workstation 50 by way of a scanning interface 40. An example of a suitable scanning interface is a SCSI interface. Examples of the workstation 50 include a personal computer or a computer terminal. The workstation 50 includes and/or has access to a storage medium 52. The workstation 50 may be adapted to communicate with a computer network 54, and/or to communicate with the Internet either directly or through the computer network 54. The digital scanner 30 may be coupled to at least one image output terminal (IOT) 60, such as a printing system, via the workstation 50, for example.

The scanning unit 20 scans an image and converts the analog signals received by the image sensing unit 28 into digital signals (digital data). An image processing unit 70 registers each image, and may execute signal correction to enhance the digital signals. In some exemplary embodiments, as the image processing unit 70 continuously processes the data, a first-in first-out (FIFO) buffer 75 temporarily stores the digital data output by the image processing unit 70, and transmits the digital data, for example, to the International Telecommunications Union (ITU) G3/G4 80 and Joint Photographic Experts Group (JPEG) 85 in bursts, so that the processed data is compressed. In other exemplary embodiments, where, for example, a two pass data segmentation and/or classification method is employed, it may be necessary to temporarily store the data for the entire image before the data is processed based on the determined information and/or pixel classifications. Other data compression units may be substituted for the ITU G3/G4 80 and the JPEG 85. The compressed digital data is stored in a memory 100, for example, by way of a Peripheral Component Interconnect Direct Memory Access (PCI/DMA) Controller 90 and a video bus 95. Alternatively, an operator may not wish to compress the digital data. The operator may bypass the compression step so that the data processed by the image processing unit 70 is sent through FIFO 75 and directly stored in the memory 100 by way of the PCI DMA controller 90.

A computing unit 110, such as a microprocessor, is coupled to the scanner interface 40, the memory 100 and the PCI DMA controller 90 by way of the video bus 95 and a video bus bridge 120. The computing unit 110 is also coupled to a flash memory 130, a static RAM 140 and a display 150. The computing unit 110 communicates with the scanning unit 20 and the image processing unit 70, for example, by way of a control/data bus. For example, the computing unit 110 may communicate with the image processing unit 70 through the video bus 95 and/or the PCI DMA controller 90. Alternatively, the computing unit 110 may communicate directly with different components, such as the image processing unit 70 by way of control/data buses (not shown).

As discussed above, automatic background suppression is used in image forming and image reproducing devices to detect the background value of the captured image and to automatically suppress the background without any user intervention or adjustment. Conventionally, background detection is performed by analyzing the lead edge statistics of a document, such as document 22, where a group of scan lines are collected to generate a histogram for the input document. As discussed in co-pending application (Xerox Docket No. D/A3276), however, full page background detection results can be used to further improve the quality of the reproduced image. Thus, a histogram may be generated based on either a portion of the document or the entire document. However, it should be understood that any known or hereafter developed method for detecting the background of the captured image may be used in various exemplary embodiments of the invention.

Using the histogram, for example, the white point and the black point of the captured image may be determined. It should be understood that the black point and the white point for the captured image may be determined based on any known or later developed method for determining the black point and the white point, respectively. For example, the white point of the image may be determined based on the portion of the histogram which identifies an intensity level of a majority of the pixels of the image. The white point may also, for example, be determined based on the shape of the white peak of the histogram. For example, the black point may be determined based on the bin number at which the accumulation starting from bin 0 exceeds a certain threshold value.

The determined white point and black point of the captured image may then be used to determine the gain factor(s). More particularly, the determined white point for the captured image and the offset value(s) determined from the determined black point for the captured image may be used to determine the gain factor(s) for the captured image. The gain factor(s) may be used to compensate for the background of the captured document.

Figure 3:
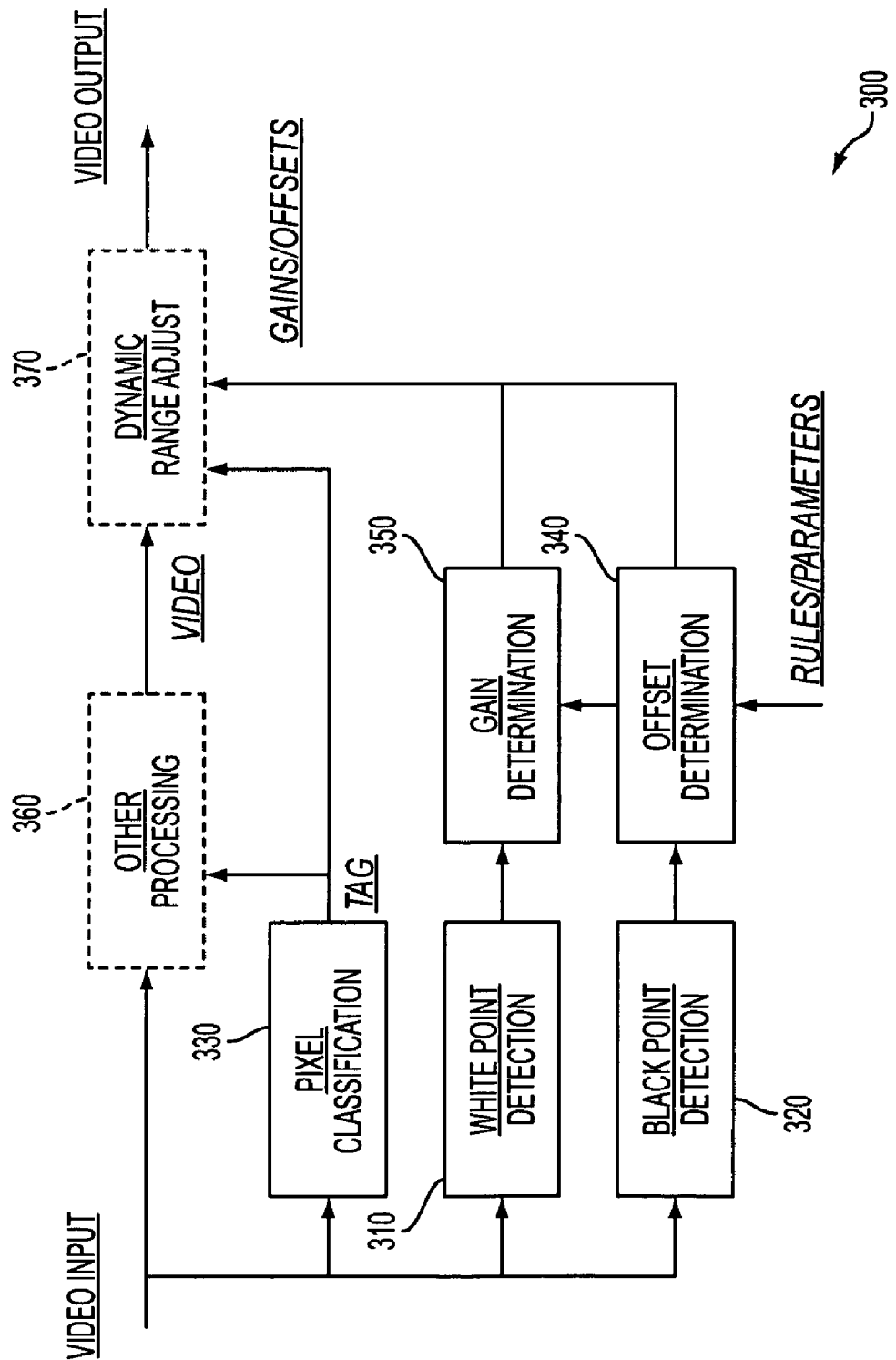
FIG. 3 is a block diagram illustrating an exemplary embodiment of a dynamic range adjustment apparatus.

FIG. 3 illustrates a block diagram of an exemplary embodiment of a dynamic range adjustment apparatus 300. As shown in FIG. 3, the dynamic range adjustment apparatus 300 includes a white point detection module 310, a black point detection module 320, a pixel classification module 330, an offset value determination module 340 and a gain value determination module 350. It should be understood that the dynamic range adjustment apparatus 300 may be a separate unit or an integrated component of an image processing or image forming device.

As shown in FIG. 3, the white point detection module 310 receives the video input signal and determines the white point of the captured image using any known or later developed methods for determining the white point of the captured image. The white point detection module 310 also outputs the determined white point of the captured image. The black point detection module 320 receives the video input signal and determines the black point of the captured image using any known or later developed methods for determining the black point of the captured image. The black point detection module 320 outputs the determined black point of the captured image. It should be understood that although the white point detection module 310 and the black point detection module 320 are illustrated separately, the modules may be integrated in various exemplary embodiments of the invention.

The white point of the captured image, which is output by the white point detection module 310, is used by the gain determination module 350 to determine the gain factor(s) for the captured image. The black point of the captured image, which is output by the black point detection module 320, is used to determine the offset value or offset values for the captured image or a portion of the captured image, respectively.

Also shown in FIG. 3 is the pixel classification module 330, which may be any known system or method for classifying pixels. U.S. Pat. Nos. 6,360,009 and 5,850,474, which are hereby incorporated by reference in their entirety, provide examples of known image segmentation and classification methods. The pixel classification module 330 outputs pixel tags associated with the pixels of the captured image. The pixel tags identify the class of image data to which the pixel belongs. For example, the pixel may be classified as smooth contone, rough contone, background, text, and the like.

The determined gain value(s) and offset value(s) are used in conjunction with pixel tags to dynamically adjust the range of the captured image data before the processed video signal is output by a dynamic range adjustment module 370. As shown in FIG. 3, for example, the gain value(s), offset value(s) and pixel tags may be used to dynamically adjust the incoming video signal, which is output from a processing module 360. The processing module 360 may, for example, process the incoming video signal based on the determined pixel classifications. For example, different filters may be applied to process different pixel classifications in order to improve the quality of the reproduced image.

As shown in FIG. 3, in various exemplary embodiments of the invention, dynamic range adjustment of image data is performed via a dynamic range adjustment module 370 using the determined white point and determined the black point. More particularly, in various exemplary embodiments of the invention, dynamic range adjustment of the image data is performed by the dynamic range adjustment module 370 using the determined gain value(s) and offset value(s) as well as the determined pixel classifications. In some exemplary embodiments, the adjustment is preferably performed based on the white point and the black point of the image determined based on the entire captured image as opposed to just a portion or leading edge of the captured image.

Figure 4:
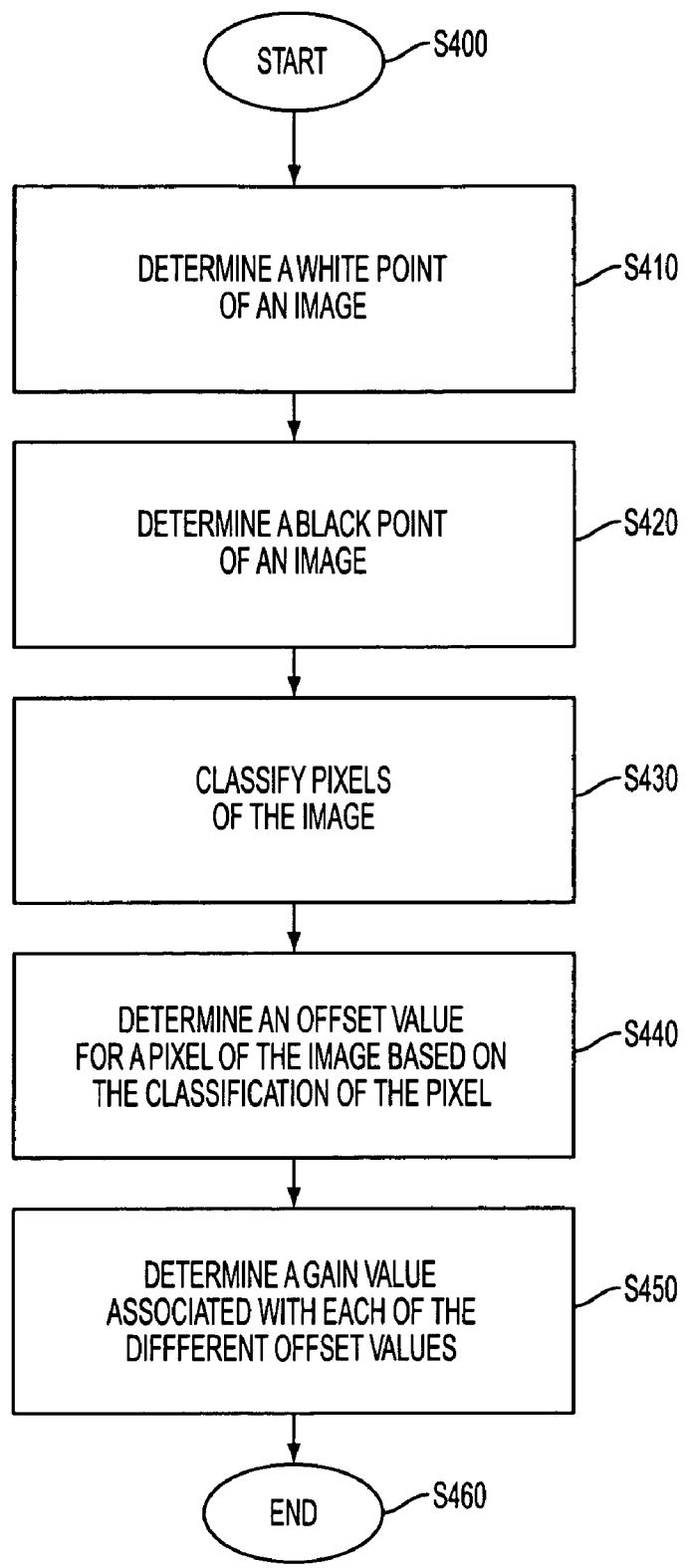
FIG. 4 is a flowchart illustrating an exemplary embodiment of a dynamic range adjust method.

FIG. 4 shows a flowchart outlining an exemplary dynamic range adjustment method for dynamic adjustment of image data. Control begins in step S400 and continues to step S410. In step S410, a white point of the captured image is determined using any known or later developed white point detection methods. In step S420, the black point of the captured image is determined using any known or later developed black point detection methods. In step S430, the pixels of the captured image are classified such that the pixels are tagged with classification tags. The classification tags may identify a pixel as, for example, text, background, black/white, color, low frequency halftone, high frequency halftone, continuous tone, and the like.

It should be understood that although the white point detection step S410, the black point detection step S420 and the pixel classification step S430 are illustrated as sequential steps, the steps may be performed in any order and/or partially or completely simultaneously.

Next, in step S440, the offset value or offset values to be used in processing the image data is/are determined. Using the determined black point of the captured image and provided rules/parameters, in various exemplary embodiments of the invention, different offset values for different types of image data may be determined. That is, for example, one offset may be determined for pixels representing text and another offset may be determined for pixels representing pictorial data.

In one exemplary embodiment of the invention, two offsets (offset_pictorial and offset_non) and two gains (gain_pictorial and gain_non) are used. In this exemplary embodiment, offset_pictorial may be applied to areas classified as pictorial windows while offset_non may be applied to the remaining portions of the captured image.

More particularly, in this exemplary embodiment, offset_pictorial is for pixels associated with pictorial portions of the captured image and offset_non is for pixels associated with non-pictorial portions of the captured image.

The value of offset_pictorial may be obtained via the following logic:

offset_pictorial=black point+margin, and when offset_pictorial>offset_pictorial_max, offset_pictorial is set to be the offset_pictorial_max,
and when offset—pictorial<offset_pictorial_min, the offset_pictorial is set to be the offset_pictorial_min,
where offset_pictorial is an offset value for the pictorial data, margin is a programmable parameter, and offset_pictorial_max and offset_pictorial_min are programmable parameters representing a maximum and a minimum desired offset value for the pictorial data.

The value of offset_non may be obtained via the following logic: offset_non=min(offset_non_max, offset_pictorial+offset_delta)where offset_non max and offset_delta are programmable parameters.

In various exemplary embodiments of the invention, the amount of adjustment is limited in order to minimize any compounding of error due to any error made during the classification of a pixel. Also, in various exemplary embodiments of the invention, the offset_pictorial_max, offset_pictorial_min, offset_non_max, and margin parameters of the equations provided above, may be provided based on scanner characteristics, the range of document types, the distribution of document types, user preference, modes, and the like. For example, if one document's darkest point is relatively light, the parameter for the offset_non_max may be set as black or, based on user preference or need, for example, to another appropriate gray level.

In step S450, a gain value associated with each of the different offset values is determined. As discussed above, the gain value(s) is/are determined based on the determined white point and the determined offset(s). For example, in the above-described exemplary embodiment where two offsets (offset_non and offset_pictorial) are determined, two gains (gain_pictorial and gain_non) may be determined. Generally, the white point and the offset value are used to derive a linear transformation, or a gain/offset pair for dynamic range adjustment. Thus, in an 8 bit system, if the same white point is maintained, then for different offsets, the corresponding gains may be calculated as follows: gain-pictorial=255/(white_point−offset_pictorial)gain_non=255/(white_point−offset_non).

In the exemplary embodiment described above, for example, different image data, such as, pictorial and non-pictorial image data, are adjusted differently in order to improve the quality of the reproduced image. For example, a low offset may be applied to the pictorial image data to preserve shadow detail, while a high offset may be applied to edge and non-pictorial pixels for improved text reproduction. Control then proceeds to step S460, where the process ends.

Various exemplary embodiments of the invention provide a dynamic range adjustment method which adjusts image data in order to improve the quality of a reproduced image. Various exemplary embodiments of the invention use the determined white point and the determined black point of the captured image to carry out the adjustment. In various exemplary embodiments of the invention, different portions of an image are subjected to different processing based on the classification of the pixels associated with each portion in order to improve the quality of the reproduced image. For example, different portions of the captured image may be subjected to different filters and/or different offsets based on the classification of the pixels associated with the respective portion.

Further, it should be understood that the above exemplary embodiments may be used in conjunction with both black and white images and color images. In color images, the black point adjustment would essentially be applied to the luminance or lightness channel. It is possible, for example, to apply one offset to black/white image data and a different offset to color data in order to improve the quality of the reproduced image. In other exemplary embodiments of the invention, pixels classified as black/white non-pictorial may be subjected to a first offset, pixels classified as color non-pictorial may be subjected to a second offset and pixels classified as pictorial may be subjected to a third offset.

While this invention has been described in conjunction with the exemplary embodiments outlined above, various alternatives, modifications, variations, improvements, and/or substantial equivalents, whether known or that are or may be presently unforeseen, may become apparent upon reviewing the foregoing disclosure. Accordingly, the exemplary embodiments of the invention, as set forth above, are intended to be illustrative, not limiting. Various changes may be made without departing from the spirit and scope of the invention.

The invention claimed is:

1. A method for dynamic range adjustment of image data, comprising:

determining a white point of an image;
determining a black point of the image;
classifying pixels of the image as one of pictorial data and non-pictorial data types; and determining an offset value for a pixel of the image based on the determined black point of the image and the classification of the pixel, wherein dynamic range adjustment of the image data is performed using the determined offset value for each type of the classified pixels and the determined white point of the image, wherein an offset value for pictorial image data is determined by:

offset_pictorial=black point+margin and when offset_pictorial>offset_pictorial_max, offset_pictorial is set to be the offset_pictorial max,
and when offset_pictorial<offset_pictorial_min, the offset_pictorial is set to be the offset_pictorial_min,
wherein offset_pictorial is an offset value for the pictorial data, margin is a programmable parameter, and offset_pictorial_max and offset pictorial_min are programmable parameters representing a maximum and a minimum desired offset value for the pictorial data.

2. The dynamic range adjustment method of claim 1, further comprising determining a gain value corresponding to each determined offset value.

3. The dynamic range adjustment method of claim 1, wherein a gain value for the pictorial image data is determined by:

gain_pictorial=255/(white_point−offset_pictorial), wherein gain_pictorial is a gain value for the pictorial data.

4. The dynamic range adjustment method of claim 1, wherein a gain value for the pictorial image data is determined by:

gain_pictorial=255/(white_point−offset_pictorial), wherein gain_pictorial is a gain value for the pictorial data.

5. The dynamic range adjustment method of claim 1, wherein an offset value for non-pictorial image data is determined as follows:

offset_non=min(offset_non_max, offset_pictorial+offset_delta,)

where offset_non is an offset value for non-pictorial data, offset_non max is a programmable value representing a maximum desired offset for the non-pictorial data and offset_delta is a programmable parameter.

6. The dynamic range adjustment method of claim 5, wherein a gain value for the non-pictorial image data is determined by:

gain_non=255/(white_point−offset_non), wherein gain_non is an offset value for non-pictorial data.

7. The dynamic range adjustment method of claim 1, wherein the non-pictorial image data are classified as one of black/white non-pictorial image data and color non-pictorial image data.

8. A dynamic range adjustment apparatus for dynamic range adjustment of image data, comprising: a white point detection module for determining a white point of an image; a black point detection module for determining a black point of the image;

a pixel classification module for classifying pixels of the image as one of pictorial data and non-pictorial data types; and an offset value determination module for determining an offset value for a pixel of the image based on the classification of the pixels and the determined black point of the image, wherein the image data is processed using the determined white point, the pixel classifications and the determined offset value for each type of classified pixel, wherein the determination module determines an offset value for pictorial image data by:

offset_pictorial=black point+margin and when offset_pictorial>offset_pictorial_max, offset_pictorial is set to be the offset_pictorial max, and
when offset_pictorial<offset_pictorial_min, the offset_pictorial is set to be offset_pictorial_min,
wherein offset_pictorial is an offset value for the pictorial data, margin is a programmable parameter and offset_pictorial_max and offset_pictorial_min are programmable parameters representing a maximum and a minimum desired offset value for the pictorial data.

9. The dynamic range adjustment apparatus of claim 8, further comprising a gain value determination module for determining a gain value corresponding to each determined offset value.

10. The dynamic range adjustment apparatus of claim 8, wherein the gain value determination module determines a gain value for pictorial image data by:

gain_pictorial=255/(white_point−offset_pictorial), wherein gain_pictorial is a gain value for the pictorial data.

11. The dynamic range adjustment apparatus of claim 8, wherein the gain value determination module determines a gain value for pictorial image data by:

gain_pictorial=255/(white_point−offset_pictorial), wherein gain_pictorial is a gain value for the pictorial data.

12. The dynamic range adjustment apparatus of claim 11, wherein an offset value for non-pictorial image data is determined as follows:

offset_non=min(offset_non_max, offset_pictorial+offset_delta)

where offset_non is an offset value for non-pictorial data, offset_non max is a programmable value representing a maximum desired offset for the non-pictorial data and offset_delta is a programmable parameter.

13. The dynamic range adjustment apparatus of claim 12, wherein the gain value determination module determines a gain value for the non-pictorial image data by:

gain_non=255/(white_point−offset_non), wherein gain_non is an offset value for non-pictorial data.

14. The dynamic range adjustment method of 8, wherein the non-pictorial image data are classified as one of black/white non-pictorial image data and color non-pictorial image data.

* * * * *